United States Patent
Brass et al.

[11] Patent Number: 5,924,633
[45] Date of Patent: Jul. 20, 1999

[54] SPRAYER TANK WITH INTERNAL THREADS AND SWIVEL HOSE OUTLET

[75] Inventors: Richard Brass, Reinbeck, Iowa;
William A. Hudson, Fox Point, Wis.;
W. J. Beissel, Hastings, Minn.

[73] Assignee: H.D. Hudson Manufacturing Company, Chicago, Ill.

[21] Appl. No.: 08/957,273

[22] Filed: Oct. 24, 1997

[51] Int. Cl.[6] ............................................. B05B 9/04
[52] U.S. Cl. ......................... 239/373; 239/530; 239/588; 285/280
[58] Field of Search ................... 239/278, 280, 239/281, 373, 588, 333, 337, 600, 530, 152–154, 532; 285/281, 280

[56] References Cited

U.S. PATENT DOCUMENTS

| | | |
|---|---|---|
| 2,032,024 | 2/1936 | Lucker . |
| 2,269,092 | 1/1942 | Leddy . |
| 2,778,374 | 1/1957 | Boyer .................................. 285/280 X |
| 3,537,652 | 11/1970 | Pearl .................................. 239/588 X |
| 4,140,337 | 2/1979 | Arcella et al. . |
| 4,400,020 | 8/1983 | Keller . |
| 4,782,982 | 11/1988 | Ellison . |
| 4,903,864 | 2/1990 | Sirhan .............................. 239/154 X |
| 5,072,884 | 12/1991 | Ellison et al. ........................... 239/152 |
| 5,307,995 | 5/1994 | Jackson et al. .......................... 239/373 |
| 5,551,470 | 9/1996 | Duvall . |

*Primary Examiner*—Kevin Weldon
*Attorney, Agent, or Firm*—Kane, Dalsimer, Sullivan, Kurucz, Levy, Eisele and Richard, LLP

[57] ABSTRACT

A sprayer tank is molded with an internally extending boss in the tank having internal threads and a shoulder at its base for receiving an O-ring of the hose adapter. Internal tank pressure enhances the seal between the tank boss and hose adapter. The hose adapter has several attributes including the ability to swivel independently of the tank fitting hose nut, pressure release slots and ability to remove the swivel part, supply tube and hose without removing the tank fitting hose nut.

19 Claims, 2 Drawing Sheets

SPRAYER TANK WITH INTERNAL THREADS AND SWIVEL HOSE OUTLET

BACKGROUND OF THE INVENTION

In the prior art, as for example in U.S. Pat. No. 4,919,311, a plastic pressure vessel or tank for garden sprayers would normally possess an outlet for the tank that has an outwardly projecting externally threaded boss (26) that couples with an internally threaded adapter (24) at one end of a hose which has at its other end a spray control valve (18).

SUMMARY OF THE INVENTION

A principal object of the present invention is a sprayer tank or other pressure vessel with an internal threaded boss that is designed to enhance the seal with a hose adapter as internal tank pressure increase.

Another object is to provide an improved hose adapter that is capable of swivel action independent of the tank fitting hose nut, that possesses pressure release slots and the ability to remove the swivel part, supply tube and hose without removing the tank fitting hose nut.

DETAILED DESCRIPTION

Figure 1:
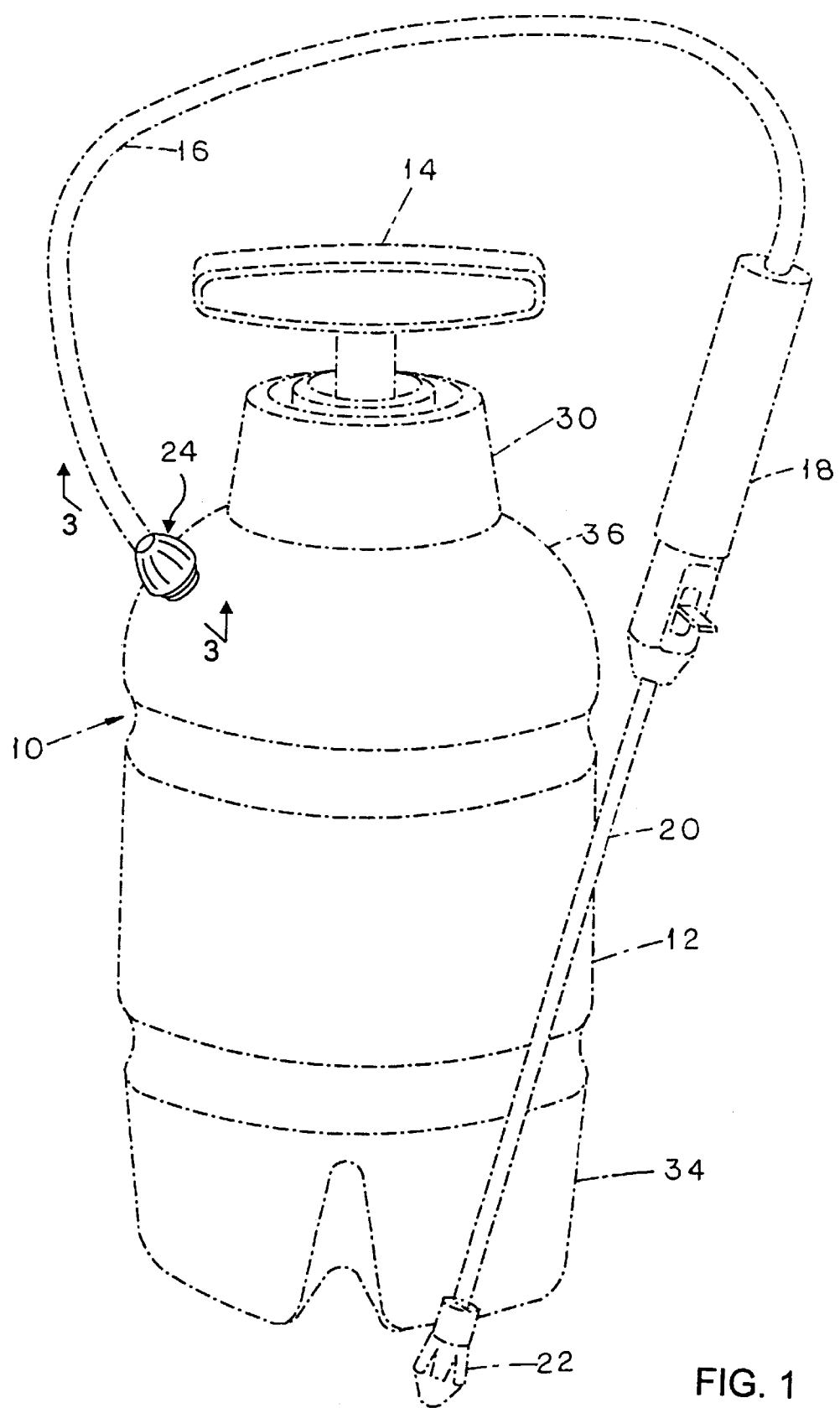
FIG. 1 is a perspective view of a blow molded plastic sprayer tank incorporating the teachings of the present invention including the internally threaded boss and novel swivel hose outlet.
Figure 2:
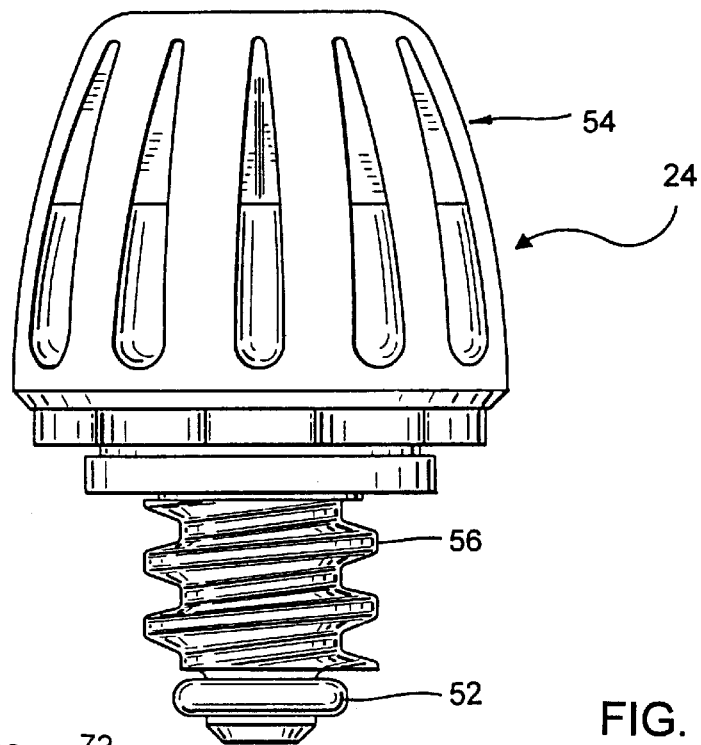
FIG. 2 is an elevational view of the swivel hose outlet.
Figure 3:
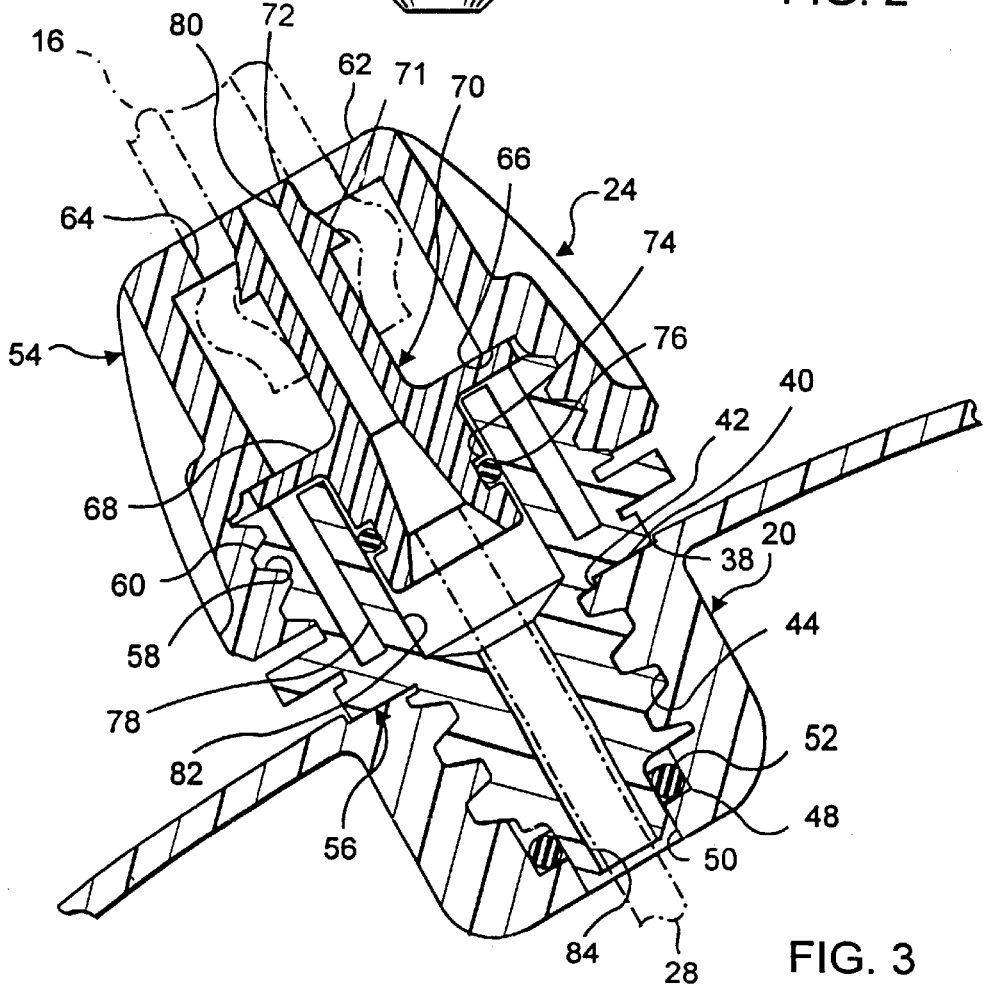
FIG. 3 is a cross sectional view of the swivel hose outlet coupled with the internally threaded boss of the sprayer tank shown fragmentarily.

In the drawings, a sprayer 10 is shown being particularly effective for the control of insects, disease and weeds and for use in the yard, garden and home. The sprayer 10 includes the tank or vessel 12 incorporating the teachings of the present invention, pump 14 for pressurizing the contents of the tank 12, hose 16 extending from the tank and terminating in a spray control valve 18 which is coupled with a rod extension 20 having an adjustable nozzle 22 for obtaining the desired spray pattern. In this connection, the nozzle 22 may be adjusted to provide a mist on the one hand to a stream on the other for projection over relatively long distances. The spray control valve 18 may be readily rotated and turned to aim the extension 20 and consequently the nozzle 22 to the selected target. The valve 18 may be actuated by depressing the illustrated valve control lever in a manner well known in the art. The hose 16 may be formed of vinyl for purposes of resisting corrosion and wear. The hose 16 is also readily removable from the tank 12 for servicing and towards this end a swivel hose adapter 24 of this invention may be utilized for such purposes, that not only connects with an internally threaded boss 26 of the tank 12 but communicates the hose 16 with a dip or supply tube 28 extending interiorly of the tank 12. The pump 14 is preferably fabricated of plastic material and is well known in the art and is designed to resist corrosion and provide relatively fast easy pump-up and pressurization of the tank interior. The pump 14 is conveniently and most advantageously secured to the neck 30 of the tank 12 by means of meshing threads (not shown) of both the tank neck and the pump exterior.

Reference is now made to the tank 12 which is preferably fabricated of one-piece integral plastic material by means of blow molding. Obviously the tank may be made utilizing other techniques and materials. A successful material for purposes of fabricating the tank 12 is polyethylene. The tank 12 is provided with a substantially cylindrical side wall 34 of any prescribed height depending on the desired capacity of the tank 12, which according to successful embodiments of the invention has capacities of 2 and 3 gallons. At the top 36 of the side wall 34 the vessel converges into the narrowed neck 30.

Referring now to the internally threaded boss 26 incorporating the teachings of this invention. The boss is provided with an outer bore 38 which communicates with a reduced bore 40 with interposed shoulder 42 therebetween. Bore 40 communicates with the internally threaded bore 44. The inner end of the bore 44 terminates on a shoulder 48 that defines bore 50. The shoulder advantageously receives O-ring 52 which cooperates with adjacent surfaces of the swivel hose adapter 24 in sealing the juncture therebetween. this seal is greatly enhanced because of the internal boss location as the internal tank pressure increases.

The swivel hose adapter 24 includes an outer housing member 54 and an inner housing member 56 which meshes with external threads 60 on the proximal end of the inner housing member 56. The outer housing member 54 is hollow and is formed with an outer flange 62 defining bore 64 which is adapted to receive hose 16. Intermediate the ends of the outer housing member 54 is internal shoulder 66 which cooperates with the proximal end of the inner housing member 56 to loosely receive therebetween flange 68 of hose connector 70. This permits the hose connector to swivel within adapter 24.

The hose connector 70 is formed with a barb 71 at its proximal end 72 for cooperating with surfaces of flange 62 to anchor the end of hose 16. The distal end of the hose connector 70 is formed with an annular recess 74 that receives an O-ring 76 that cooperates in sealing the junction between the distal end of the hose connector 70 and the inner concentric cylinder 78 on the proximal end of the inner housing member 56. The hose connector 70 is formed with an internal bore 80 that communicates with the bore of hose 16 and the internal bore 82 defined by cylinder 78. Bore 82 communicates with bore 84 in the distal end of the inner housing member which receives the dip tube 28 which extends into the bottom of the tank interior.

Thus the present invention provides improved and enhanced sealing between the adapter 24 and the boss 26 because of the location of the latter internally within the tank interior. Moreover, the adapter 24 permits more efficient and convenient operation of the spray control valve 18 and rod extension 20 because the hose connector 70 is permitted to swivel or move.

Thus, the several aforenoted objects and advantages are most effectively attained. Although a single somewhat preferred embodiment of the invention has been disclosed and described in detail herein, it should be understood that its scope is to be determined by that of the appended claims.

We claim:

1. A pressure vessel comprising in combination:
   a side wall, a top, and a closed bottom and an internal surface and an interior;
   means at the top for receiving a pump for pressurizing the tanks interior;
   an outlet hose coupling means on the side wall near the top for coupling with an outlet hose adapter for passage of the contents out of the vessel under pressure, the hose coupling means including a boss extending from the internal surface into the interior of the vessel;

the boss having means for coupling with a hose adapter and means for cooperating in providing a seal with the hose adapter.

2. The invention in accordance with claim 1 wherein the means for coupling with the hose adapter includes a bore having internal threads for coupling with mating threads of the hose adapter.

3. The invention in accordance with claim 2 wherein the boss has an innermost distal end including a flange for cooperating in providing a seal with the hose adapter.

4. The invention in accordance with claim 3 wherein an O-ring engages the flange for cooperating in providing a seal with the hose adapter.

5. The invention in accordance with claim 1 wherein the hose adapter includes an outer housing member, an inner housing member having a through bore and adapted to couple with the boss of the pressure vessel, a hose connector having a through bore, the outer and inner housing members cooperating in providing means for permitting the hose connector to swivel with respect to the housing members, the through bores being in fluid communication with one another.

6. The invention in accordance with claim 5 wherein the hose connector includes a proximal end for coupling with an end of a hose.

7. A pressure vessel comprising in combination:

a side wall, a top, and a closed bottom and an internal surface and an interior;

a hose coupling means on the side wall near the top for coupling with a hose adapter for passage of the contents of the vessel under pressure, the hose coupling means including a boss extending from the internal surface into the interior of the vessel;

the boss having means for coupling with a hose adapter and means for cooperating in providing a seal with the hose adapter, the hose adapter including an outer housing member having a through bore and adapted to couple with the boss of the pressure vessel;

a hose connector having a through bore, the outer and inner housing members cooperating in providing means for permitting the hose connector to swivel with respect to the housing members, the through bores being in fluid communication with one another, the hose connector including a proximal end for coupling with an end of a hose;

the hose connector including a radially extending flange, with surface means on the outer and inner housing members for receiving the flange of the hose connector in providing the swivel means.

8. The invention in accordance with claim 7 wherein the hose connector and inner housing member having means for cooperating in providing a seal therebetween.

9. A swivel hose adapter comprising an outer housing member having a through bore and an inner housing member having a through bore adapted to couple with an outlet boss of a pressure vessel, a hose connector having a through bore, the outer and inner housing members cooperating in providing means for permitting the hose connector to swivel with respect to the housing members, the through bores of one of the members and the hose connector being in fluid communication with one another.

10. The invention in accordance with claim 9 wherein the hose connector includes a proximal end for coupling with an end of a hose.

11. The invention in accordance with claim 10 wherein the hose connector includes a radially extending flange, with surface means on the outer and inner housing members for receiving the flange of the hose connector in providing the swivel means.

12. The invention in accordance with claim 11 wherein the hose connector and inner housing member having means for cooperating in providing a seal therebetween.

13. The invention in accordance with claim 1 wherein the pressure vessel is an all plastic, one piece blow molded vessel.

14. The invention in accordance with claim 1 wherein the pressure vessel is a sprayer.

15. A pressure vessel comprising in combination:

a side wall, a top, a closed bottom, and an interior;

means at the top for pressurizing the interior;

an outlet hose coupling means on the side wall near the top for coupling with an outlet hose adapter for passage of the contents out of the vessel under pressure;

the hose adapter comprising a housing having a through bore, a hose connector having a through bore, the housing providing means for permitting the hose connector to swivel with respect to the housing, the through bores being in fluid communication with one another and with the vessel interior.

16. The invention in accordance with claim 15 wherein the means for coupling with the hose adapter includes threads for coupling with mating threads of the hose adapter.

17. The invention in accordance with claim 15 wherein the hose connector includes a proximal end for coupling with an end of a hose.

18. A pressure vessel comprising in combination:

a side wall, a top, a closed bottom, and an interior;

a hose coupling means on the side wall near the top for coupling with a hose adapter for passage of the contents of the vessel under pressure;

the hose adapter comprising a housing having a through bore, a hose connector having a through bore, the housing providing means for permitting the hose connector to swivel with respect to the housing, the through bores being in fluid communication with one another and with the vessel interior;

the hose connector including a radially extending flange, with surface means on the housing for receiving the flange of the hose connector in providing the swivel means.

19. The invention in accordance with claim 7 wherein the hose connector and inner housing member having means for cooperating in providing a seal therebetween.

* * * * *